United States Patent [19]

Pearce et al.

[11] 4,111,071

[45] Sep. 5, 1978

[54] MODULATING RELIEF VALVE WITH HYDRAULIC SAFETY

[75] Inventors: Shairyl I. Pearce, East Peoria; Sidney J. Audiffred, Washington, both of Ill.

[73] Assignee: Caterpillar Tractor Co., Peoria, Ill.

[21] Appl. No.: 503,595

[22] Filed: Sep. 6, 1974

[51] Int. Cl.² .......................... F16H 3/44; F16D 19/00
[52] U.S. Cl. ..................................... 74/753; 192/87.13
[58] Field of Search .......................... 74/753, 754, 364; 192/87.13, 87.19

[56] References Cited

U.S. PATENT DOCUMENTS

| | | | |
|---|---|---|---|
| 3,468,194 | 9/1969 | Horsch et al. ..................... | 192/87.13 |
| 3,596,536 | 8/1971 | Starling .............................. | 74/753 |
| 3,640,146 | 2/1972 | Barnes ............................... | 74/753 X |
| 3,709,065 | 1/1973 | Starling .............................. | 74/753 |
| 3,863,523 | 2/1975 | Starling et al. .................... | 74/753 X |

*Primary Examiner*—Leonard H. Gerin
*Attorney, Agent, or Firm*—Phillips, Moore, Weissenberger, Lempio & Strabala

[57] ABSTRACT

A safety valve includes a movable piston which functions to prevent actuation of fluid operated drive conditioning clutches of a vehicle transmission unless the selector valve means are passed through a neutral position. Such safety valve spool also acts as a load piston for a pressure modulating relief valve of the system.

4 Claims, 4 Drawing Figures

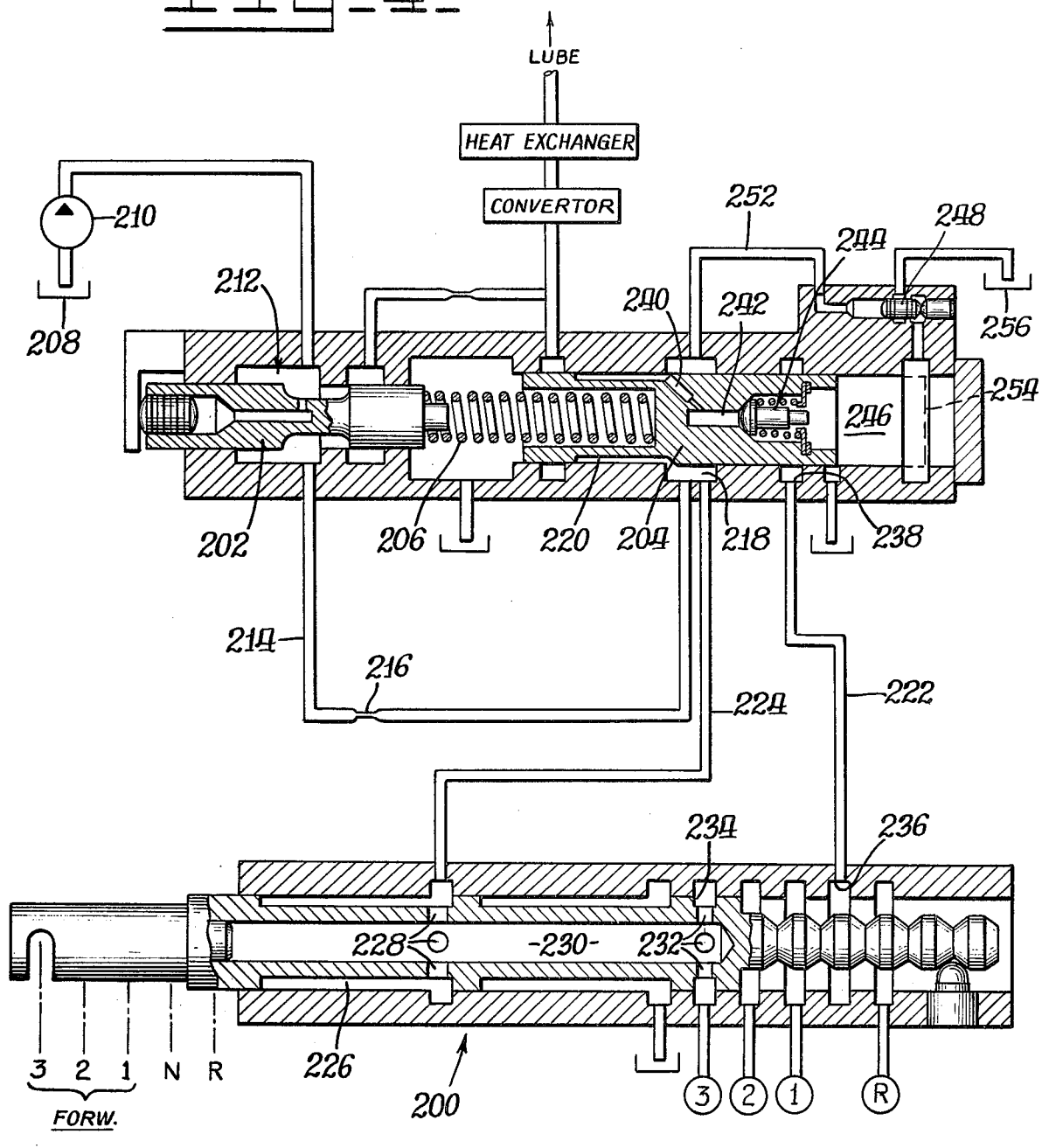

MODULATING RELIEF VALVE WITH HYDRAULIC SAFETY

BACKGROUND OF THE INVENTION

This invention relates to drive transmissions for powered vehicles, and more particularly, to a fluid pressure operated control system for shifting such a transmission between drive conditions.

In general, transmissions for vehicle use include a number of clutches or brakes which are actuated by fluid pressure supplied thereto to establish selected drive conditions within the transmission in response to movement of a vehicle operator's shift lever.

Smooth, efficient shifting requires careful control and coordination of the pressure changes at the several clutches or brakes. This, in turn, requires a fairly complex pressure modulating system between the source of operating fluid and the selector valve which directs such fluid to the appropriate clutches.

For optimum performance and safety, a transmission control system should also provide certain functions in addition to such pressure modulation. For example, it can be hazardous to the operator and equipment if the vehicle should be started while the transmission controls are positioned in other than the neutral position.

Toward this end, it is desirable to provide a safety device which prevents actuation of the mechanisms of the transmission when fluid pressure is first supplied to the system unless the shift control lever is in neutral, or until such time as the shift control lever is momentarily returned to neutral.

Patents of interest in this area include U.S. Pat. No. 3,596,536 to Starling, and U.S. Pat. No. 3,468,194 to Horsch et al (both assigned to the assignee of this invention). While such systems as disclosed in those patents have proved to be relatively effective in operation, it will be understood that it is always desirable to vary such systems so as to provide for greater efficiency in the use thereof in a particular environment.

SUMMARY OF THE INVENTION

It is therefore an object of this invention to provide a control system for shifting a vehicle transmission, wherein the actuation of the selected one of the drive mechanisms of the transmission is prevented unless the transmission controls are positioned in neutral.

It is a further object of this invention to provide a control system for shifting a vehicle transmission which is extremely simple in design and effective in operation.

Broadly stated, the invention herein is in combination with a transmission having a plurality of fluid pressure actuated drive conditioning devices, and comprises a fluid system. Such fluid system includes a source of fluid pressure, and safety valve means comprising a housing and a spool movable therein to first and second positions. Means are included for biasing the safety valve spool into its first position. Further included are selector valve means having a plurality of drive conditioning positions, and a neutral position. Means are associated with a source of fluid pressure, selector valve means, and safety valve means so that upon initial selection of other than neutral position, the safety valve spool is in and remains in its first position so that fluid pressure is exhausted from the system to in turn prevent actuation of any of the drive conditioning devices, and upon movement of the selector valve means into the neutral position, fluid pressure is supplied to the safety valve spool to move it against the bias, into its second position, to allow fluid pressure buildup in a selected drive conditioning device, determined by selection of a selector valve means drive conditioning position. Further included are modulating relief valve means associated with the fluid pressure source and comprising the housing and a modulating relief valve spool movable to a first position allowing fluid pressure to be supplied from the source to the safety valve means and selector valve means, and movable away from its first position to limit the level of fluid pressure supplied to the safety valve means and selector valve means. Means are included for biasing the modulating relief valve spool into its first position.

BRIEF DESCRIPTION OF THE DRAWINGS

These and other objects of the invention will become apparent from a study of the following specification and drawings, in which:

FIG. 4 is a view, partially sectional and partially schematic, of a third embodiment of transmission shift control system incorporating the invention.

DESCRIPTION OF THE PREFERRED EMBODIMENTS

Figure 1:
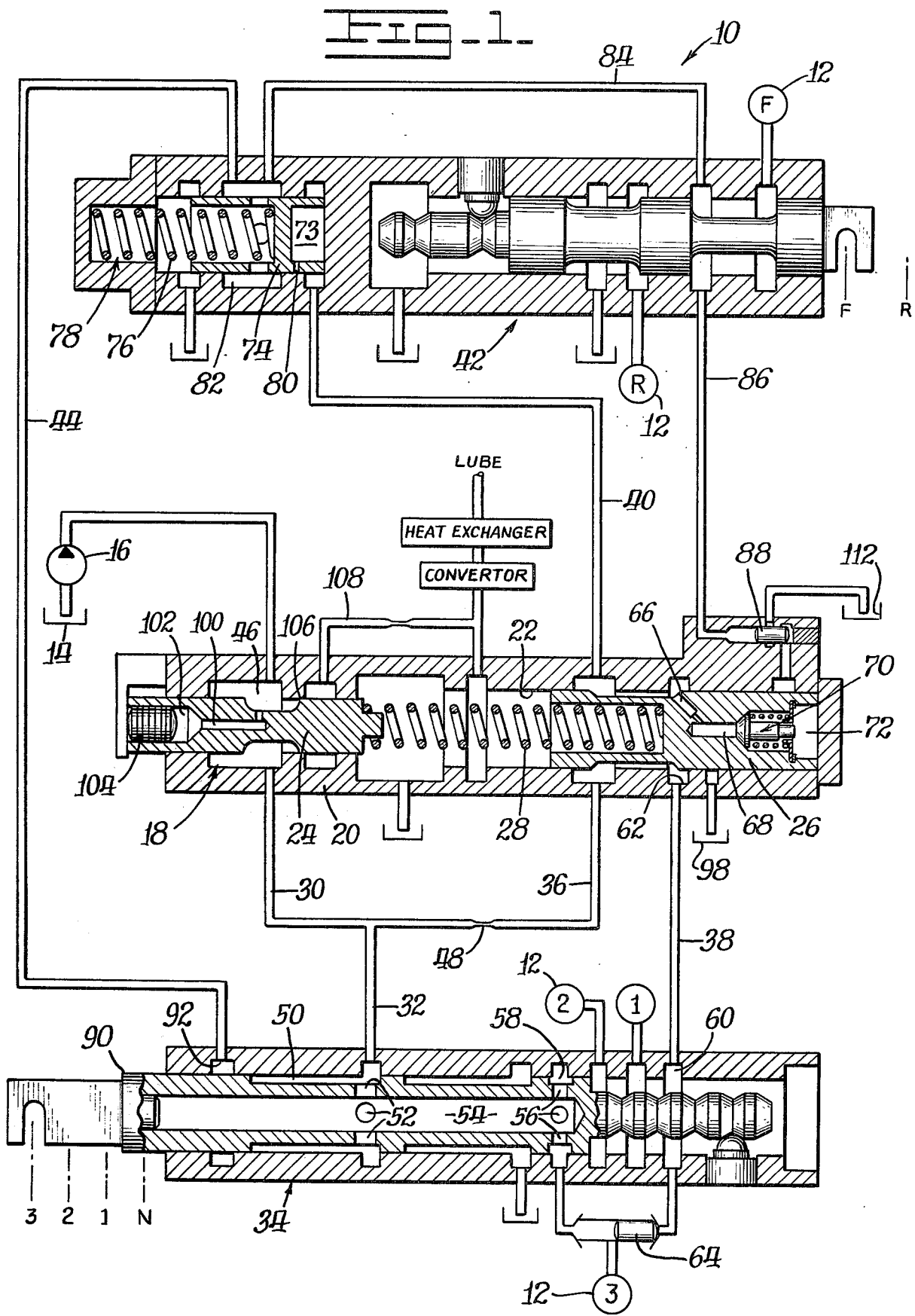
FIG. 1 is a view, partially sectional and partially schematic, of a first embodiment of transmission shift control incorporating the invention.

Referring to FIG. 1, a transmission control system is shown at 10. The components thereof are shown in the "start" positions, prior to starting of the vehicle engine. Transmissions of the type to which system 10 is applicable include a plurality of fluid pressure actuated drive conditioning devices 12, including a plurality of speed clutches 12-1, 12-2, 12-3, and a plurality of directional clutches 12F, 12R. To obtain a positive gear selection in the transmission for which the system 10 of FIG. 1 is designed, one directional clutch and one speed clutch is actuated. The internal construction of such clutches and their disposition and function in a transmission are well understood in the art and accordingly will not be further described herein.

Again, referring to FIG. 1, fluid under pressure for actuating the clutches 12 is provided from a reservoir 14 by a pump 16, driven by the vehicle engine, which delivers the pressurized fluid to a modulating relief valve 18. Such modulating relief valve includes a housing 20 defining a bore 22 within which a modulating relief valve spool 24 is movably disposed. Also disposed in the bore 22 and movable therewithin is a safety valve spool 26, and disposed between the spool 24 and spool 26 is a helical spring 28, for biasing the spool 24 and spool 26 outwardly of each other into respective first positions. The spools 24,26 are each movable generally along a common longitudinal axis, and are movable relatively toward each other from their respective first positions. Conduits 30 and 32 connect the housing 20 with a speed clutch selector valve 34. A conduit 36 connects conduit 30 and housing 20 adjacent the safety valve spool 26, and a conduit 38 interconnects the speed clutch selector valve 34 and the housing 20 adjacent such spool 26. Conduit 40 interconnects the housing 20 adjacent the spool 26 and a directional clutch selector valve 42, and a conduit 44 interconnects such directional clutch selector valve 42 and the speed clutch selector valve 34 as shown.

After the engine has started with the directional valve 42 and speed selector valve 34 in the positions shown, with the spool 24 and spool 26 extended in opposite directions by the spring 28, fluid from the pump 16 passes into chamber 46 within the housing 20, conduit 30, conduit 36, which defines a restrictive orifice 48 therein to limit fluid flow, through conduit 38 to drain through the housing of the selector valve 34 and rightwardly from the end thereof shown in FIG. 1, to prevent pressurizing of any of the drive devices even though the machine is inadvertently in gear. In such state, the safety valve spool 26 is in and remains in its first position so that fluid pressure is exhausted from the system. The modulating relief valve spool 24 is in its first position to allow fluid pressure to be supplied from the source 14 to the spool 24 and the selector valve 34.

Should the operator now wish to move the vehicle, the selector valve 34 must be moved to the right into the neutral position. In this position, fluid pressure from conduit 32 passes around an annulus 50 through holes 52 into chamber 54 and out through holes 56, with the annulus 58 and groove 60 in alignment to allow fluid to flow up through conduit 38 into groove 62 defined by the housing 20. In this position, fluid pressure also moves slug 64 associated with selector valve 34 to the left to fill the clutch 12-3. As fluid pressure increases, fluid passes through a hole 66 in the spool, and into a chamber 68 permitting a check valve 70 to open and pressurize a chamber 72, causing the spool 26 to move to the left into a second position, closing the groove 62. During this operation, fluid pressure is also simultaneously filling the conduit 40 to pressurize a chamber 73 to move a differential valve spool 74 leftwardly against a force from a spring 76 in a chamber 78 until a hole 80 defined by the spool 74 opens to a groove 82 to permit fluid to pass through conduit 84 connecting the differential valve spool 74 and selector valve 42 to pressurize forward clutch 12F. Such pressurization also acts in a conduit 86 which connects the housing 20 and the selector valve 42, to move the slug 88 to the right as shown in FIG. 1. Even though the spool 26 and the differential valve spool 74 have moved leftwardly, if the speed selector valve 34 remains in neutral, an edge 90 is opened to a groove 92 associated with speed selector valve 34, and the pressure in the groove 92 will drain through the conduit 44 and the forward clutch 12F will not be pressurized.

Thus, through the above means, fluid pressure is supplied to the safety valve spool 26 to move it against the bias of spring 28 into its second position.

Figure 2:
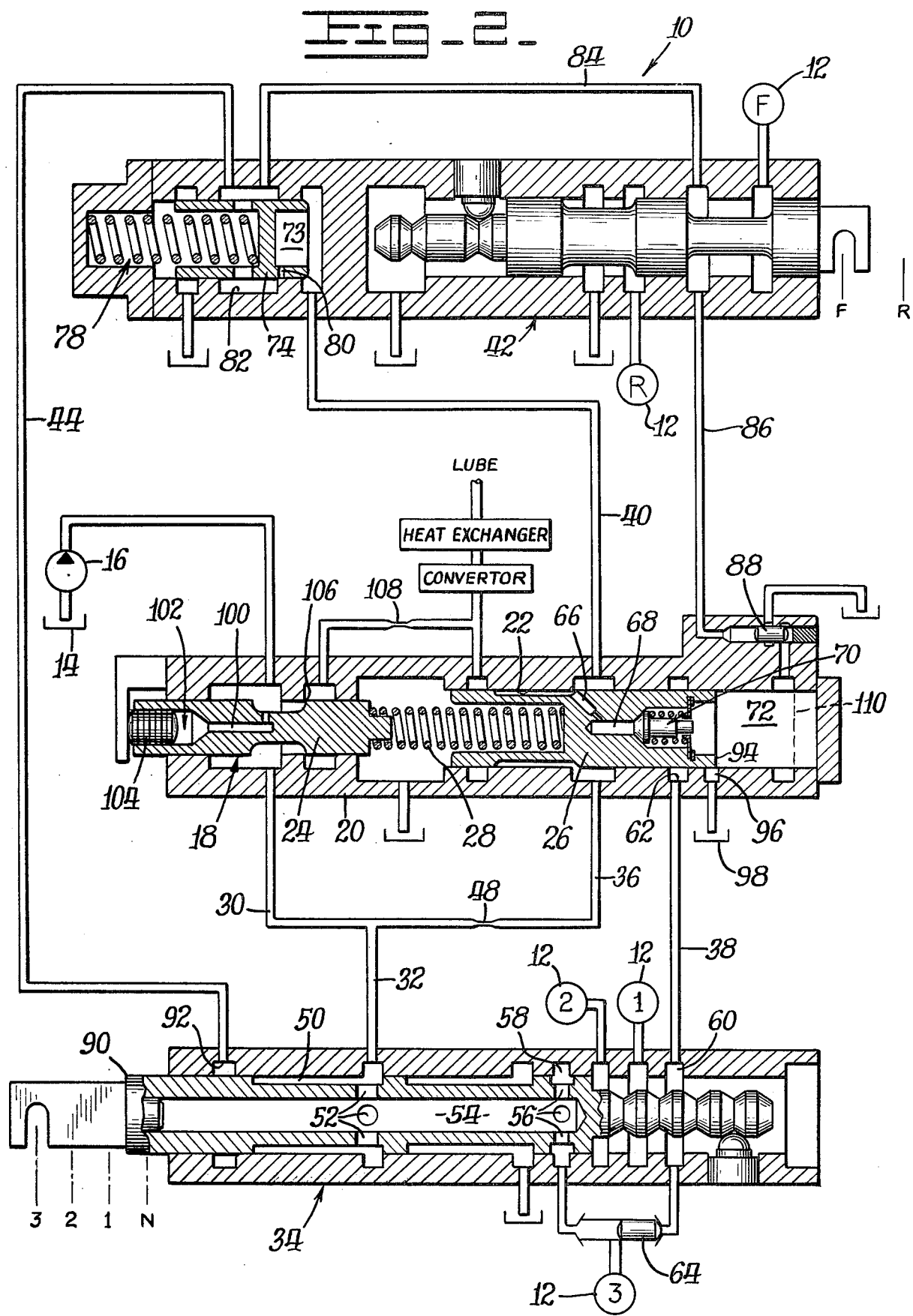
FIG. 2 is a view of the system of FIG. 1, showing the elements thereof in a different state.

Referring to FIG. 2, when fluid pressure has reached the predetermined operating setting and the speed selector valve 34 is moved back leftwardly to select the third speed clutch 12-3, the slug 64 is moved rightwardly so that clutches 12F, 12-3 are engaged. The spool 26 will have moved leftwardly until the edge 94 thereof meets the edge of a hole 96 defined by the housing 20 which communicates with drain 98, to regulate the pressure setting. When pressure in the chamber 72 exceeds the pressure setting desired, excess pressure will pass to drain 98.

FIG. 2 shows the spool 26 in an operating position with the clutch devices 12F, 12-3 engaged. The modulating relief valve spool 24 will also move rightwardly under pressure passing through hole 100 into a pressure chamber 102 working against a slug 104 to provide flow across edges 106 into passage 108 to pressurize the torque converter, heat exchanger, and lube circuits of the vehicle. Thus, the spool 24 is movable away from its first position to limit the level of fluid pressure supplied to the selector valves 34,42.

In vehicle operation should a directional or speed change be desired, the selector valves 34,42 are moved accordingly, causing the system pressures to drop to fill the selected clutch and move the spool 26 rightwardly to a phantom line shown at 110. The slug 88 has been moved leftwardly to allow chamber 72 to communicate with drain 112. Thus, after the newly selected speed clutch fills and pressurizes, the spool 26 will move leftwardly again to pressurize the required directional clutch selected.

It will be seen that the safety valve spool 26 acts as a load piston for the modulating relief valve spool 24 in the operation of the system.

Figure 3:
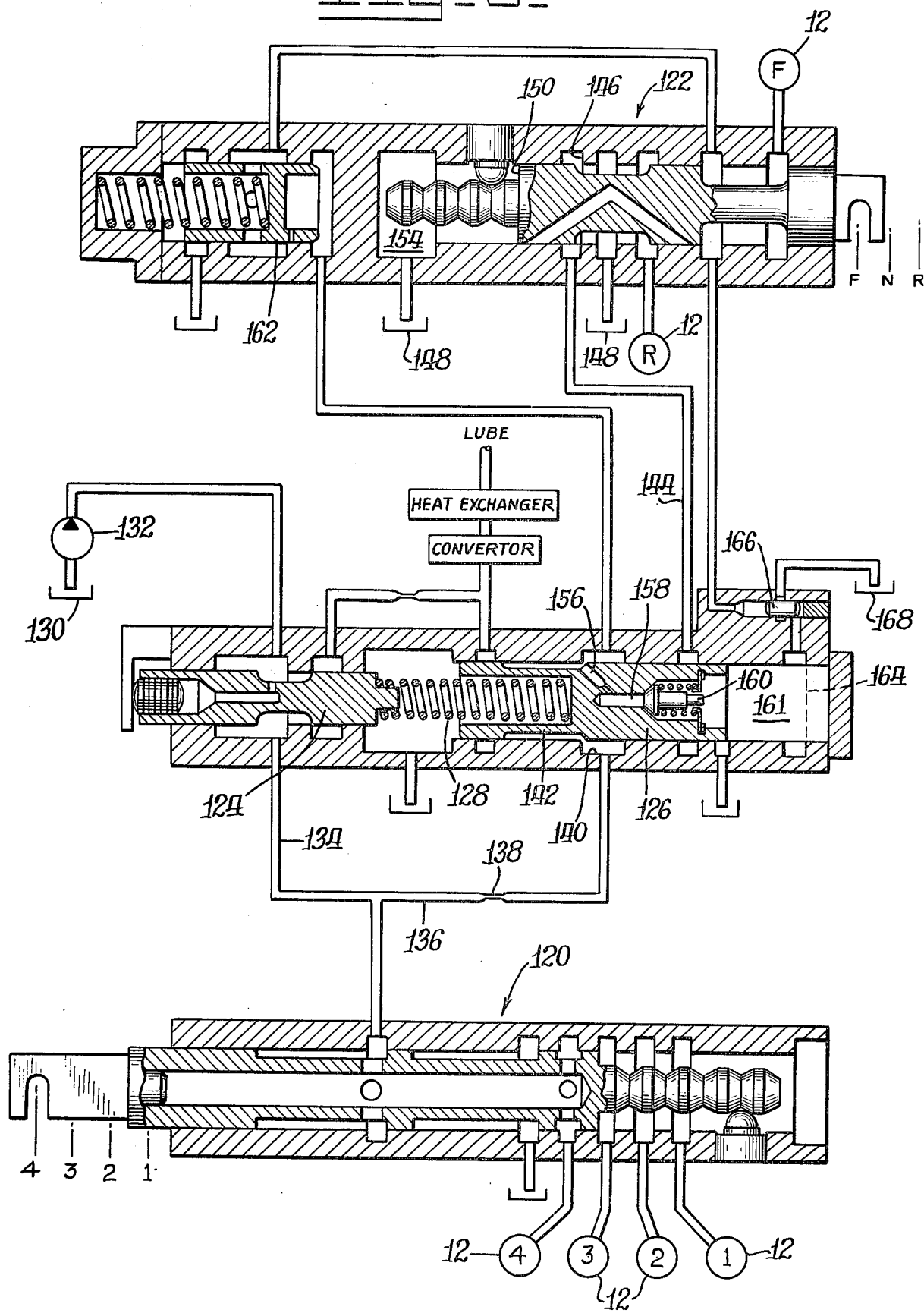
FIG. 3 is a view, partially sectional and partially schematic, of a second embodiment of transmission shift control system incorporating the invention.

In the FIGS. 1 and 2 embodiment, the speed selector valve 34 defines the neutral position. In the embodiment shown in FIG. 3, the speed selector valve 120 is associated with four speed clutches 12-1,12-2,12-3,12-4 and the directional selector 122 defines the neutral position. Referring to such FIG. 3, in a normal "start" condition, the modulating relief valve spool 124 and the load piston safety valve spool 126 are urged toward their opposite ends by the force of a spring 128 as shown in FIG. 1. In such "start" position, fluid provided from the reservoir 130 by pump 132 delivers pressurized fluid through conduits 134,136 and restrictive orifice 138 to a groove 140 around an annulus 142, with the spool 126 in its rightward or first position. It will be observed that fluid flow in the conduit 144 passing over an edge 146 of selector valve 122 passes to drain 148 even though the directional valve 122 is positioned in a forward position. Likewise should valve 122 be in a reverse position, edge 150 would line up with edge 146 to permit flow in conduit 144 to flow into a chamber 154 and thence to drain 148. Therefore, should the directional valve inadvertently be in either forward or reverse in a "start" mode, the vehicle will not move until the operator moves the valve 122 through neutral to block conduit 144. This permits fluid pressure in groove 140 to increase and allow fluid to pass through hole 156 into chamber 158 to open check valve 160 and pressurize chamber 161, causing spool 126 to move leftwardly into an operating position as shown in FIG. 3. In such operating mode the modulating relief valve spool 124 and differential valve spool 162 operate in the same manner as previously described.

During vehicle operation, should a directional or speed change be required, the valves 120,122 are moved accordingly, causing the engaged clutch pressures to drop, moving the load piston safety valve spool 126 to the phantom line 164. The slug 166 is moved leftwardly thereby to allow chamber 162 to communicate with drain 168.

Referring now to FIG. 4, shown therein is a three speed control system similar in operating mode to the three speed system already described, except that reverse is now located on a speed selector and directional valve 200. In a normal "start" condition, the modulating relief valve spool 202 and the load piston safety valve spool 204 are on a coaxial relationship and are urged toward their opposite ends by the force of a spring 206. Fluid provided from the reservoir 208 by pump 210 delivers pressurized fluid through chamber 212, and conduit 214 and a restrictive orifice 216 therein, to a groove 218 around an annulus 220 associated with selector valve 200, to limit fluid flow to drain through conduit 222 to prevent pressurizing of any of the drive devices when the spool 204 is in its extreme rightward position, even though the vehicle is inadvertently in gear. With spool 204 in its rightward position, fluid flow around annulus 220 passes through conduit 222 to drain whenever the selector valve 200 is inadvertently in a speed range, excluding the neutral position. The vehicle will thus not move until the operator moves the selector valve 200 through neutral to block all drains, causing fluid pressure to flow from conduits 214,224, passing around annulus 226, through holes 228, into chamber 230, and out through holes 232, wherein the annulus 234 and groove 236 are in alignment to allow fluid to flow through conduit 222 and into groove 238. Increased pressure in conduit 224 and conduit 222 supplied to groove 238 also increases fluid pressure through hole 240 into chamber 242, permitting check valve 244 to open and pressurize chamber 246, causing safety valve spool 204 to move left against spring 206, in turn closing groove 238. During the pressure increase, the slug 248 will have also moved rightwardly under pressure from groove 218 supplied through conduit 252. The modulating relief valve spool 202 is located between the pump 210 and the clutch selector valve 200, to maintain system pressure at a constant predetermined level. FIG. 4 shows the spool 204 in an operating position with clutch device engaged. The spool 202 will also have moved rightwardly due to fluid pressure acting in a manner as previously described, to pressurize the torque converter, heat exchanger, and lube circuits of the vehicle.

In vehicle operation, should a directional or speed change be desired, the valve 200 may be moved accordingly, causing the system pressures to drop to fill the selected clutch and move the spool rightwardly to a phantom line 254. The slug 248 will have now moved leftwardly to allow the chamber to communicate with drain 256. Therefore, after the newly selected speed clutch fills and pressurizes, the spool 204 moves leftwardly again to pressurize the required clutch selected.

What is claimed is:

1. In combination with a transmission having a plurality of fluid pressure actuated drive conditioning devices, a fluid system comprising: a source of fluid pressure; safety valve means comprising a housing and a spool movable therein to first and second positions; means for biasing the safety valve spool into its first position; selector valve means having a plurality of drive conditioning positions, and a neutral position; means associated with the source of fluid pressure, selector valve means, and safety valve means so that upon initial selection of other than neutral position, the safety valve spool is in and remains in its first position so that fluid pressure is exhausted from the system to in turn prevent actuation of any of the drive conditioning devices, and upon movement of the selector valve means into said neutral position, fluid pressure is supplied to the safety valve spool to move it against said bias into its second position, to allow fluid pressure buildup in a selected drive conditioning device, determined by selection of a selector valve means drive conditioning position; modulating relief valve means associated with said fluid pressure source and comprising said housing and a modulating relief valve spool movable to a first position allowing fluid pressure to be supplied from said source to the safety valve means and selector valve means, and movable away from its first position to limit the level of fluid pressure supplied to said selector valve means; and means for biasing the modulating relief valve spool into its first position, wherein the means for biasing the safety valve spool into its first position, and the means for biasing the modulating relief valve spool into its first position, comprise a helical spring disposed between the safety valve spool and the modulating relief valve spool, whereby the safety valve spool acts as a load piston for the modulating relief valve spool.

2. The apparatus of claim 1 wherein the safety valve spool and the modulating relief valve spool are mounted in a common housing bore, and are movable generally along a common longitudinal axis, and are movable relatively toward each other from their respective first positions.

3. The apparatus of claim 2 wherein the selector valve means comprise a first selector valve determining forward and reverse drive conditions, and a second selector valve determining speed drive conditions, and wherein said second selector valve defines said neutral position.

4. The apparatus of claim 2 wherein the selector valve means comprise a first selector valve determining forward and reverse drive conditions, and a second selector valve determining speed drive conditions and wherein said first selector valve defines said neutral position.

* * * * *